Patented June 3, 1930

1,761,814

UNITED STATES PATENT OFFICE

HERMAN ALEXANDER BRUSON, OF PHILADELPHIA, PENNSYLVANIA, ASSIGNOR TO THE RESINOUS PRODUCTS & CHEMICAL COMPANY, A CORPORATION OF DELAWARE

METHOD OF COATING RUBBER WITH CELLULOSIC DERIVATIVES

No Drawing.    Application filed March 5, 1929.  Serial No. 344,601.

As previously disclosed in my co-pending patent applications (Serial Nos. 311,256 and 333,525) the soluble, plastic condensation products obtained by heating polyhydric alcohols such as glycerol, with long-chained, aliphatic, diabasic acids containing six or more carbon atoms in a normal straight chain; notably, adipic, pimelic, suberic, azelaic, and sebacic acids; may be incorporated in nitro-cellulose solutions to yield upon evaporation, transparent, elastic films that are very flexible and adhere well to porous bodies such as leather, paper, woven fabrics and rubber.

It has now been found that such films when applied to a rubber surface, either vulcanized or unvulcanized, as for example, on vulcanized rubber sheets, hollow soft rubber objects, rubberized fabric, and the like, adhere tenaciously to the rubber surface. The degree of adhesion is considerably greater than any heretofore obtainable by the use of other plasticizers or softening agents, such as tricresyl phosphate, castor oil, dibutyl phthalate and other compounds at present recoognized in the art. Moreover, this degree of adhesion is attained without sacrificing the flexibility or the hardness of the film, and in addition, the film is impervious to oils or hydrocarbons.

One method of practicing my invention consists in adding to a solution of nitro-cellulose, or other cellulosic derivative, a suitable quantity of a condensation product of sebacic acid and glycerol, prepared by heating equi-molecular quantities of sebacic acid and glycerol. The degree of adhesion of the nitro-cellulose to the rubber, as well as the hardness of the film is influenced by the quantity of the condensation product used. In general, this latter quantity ranges from 150 percent to 500 percent on the weight of the dry nitro-cellulose employed, depending upon the type of film desired. The clear solution thus obtained with, for example, a 20% solution of nitro-cellulose in butyl acetate-toluol mixture, may be used directly for coating rubber objects. If desired, pigments or coloring materials may be added, and for special purposes it may be advantageous to add other plasticizers such as are at present recognized in the art. In some cases, it may be desirable to coat the rubber object first, with the condensation product itself so as to afford a tacky surface, and subsequently, to superimpose a film of nitro-cellulose thereupon.

The condensation products which may be used as plastic softeners for the above purposes are not limited to those of glycerol and sebacic acid, but may include any of the soluble products that are formed by heating glycerol, polyglycerol or other polyhydric alcohol, with dibacic acids that contain at least six carbon atoms in a normal straight chain, namely; adipic, pimelic, suberic and azelaic acids, or mixtures of these, as enumerated and described in the aforementioned co-pending patent applications.

Furthermore, cellulose acetate or other cellulose derivatives which are soluble in organic solvents that are also capable of dissolving the plastic condensation product itself, may be used in lieu of nitro-cellulose.

From the description hereinabove set forth, it will be understood that the principles of my invention are neither limited to the specific proportions nor to the specific solvents indicated, but it will be appreciated by those skilled in the art that numerous modifications are possible without departing from the scope of the invention.

I claim:

1. A method of coating rubber which consists in applying a mixture of nitro-cellulose and a condensation product of sebacic acid and glycerol dissolved in a mutual solvent.

2. A method of coating rubber which consists in applying thereto a mixture of a cellulosic derivative and a resin which is a condensation product of a polyhydric alcohol with a member of the group consisting of adipic, pimelic, suberic, azelaic and sebacic acids.

3. A method of coating rubber which consists in applying a mixture of a cellulosic derivative and a condensation product of sebacic acid and a polyhydric alcohol dissolved in a mutual solvent.

4. A method of coating rubber which consists in applying a mixture of a cellulosic derivative and a condensation product of sebacic acid and glycerol, dissolved in a mutual solvent.

5. A rubber article carrying an adherent film composed of a cellulosic derivative and a resin which is a condensation production of a polyhydric alcohol with a member of the group consisting of adipic, pimelic, suberic, azealic and sebacic acids.

6. A rubber article carrying an adherent film composed of a cellulosic derivative and a resin which is a condensation product of sebacic acid and a polyhydric alcohol.

7. A rubber article carrying an adherent film composed of nitrocellulose and a resin which is the condensation product of sebacic acid and glycerol.

8. A rubber article carrying an adherent film comprising a condensation product of sebacic acid and a polyhydric alcohol.

9. A method of coating rubber which consists in applying thereto a mixture of nitrocellulose and a condensation product of a polyhydric alcohol with a member of the group consisting of adipic, pimelic, suberic, azelaic and sebacic acids.

10. A method of coating rubber which consists in applying thereto a mixture of nitrocellulose and a condensation product of a polyhydric alcohol with sebacic acid.

11. A rubber article carrying an adherent film composed of nitrocellulose and a condensation product of a polyhydric alcohol and sebacic acid.

12. A rubber article carrying an adherent film composed of nitrocellulose and a condensation product of glycerol with a member of the group consisting of adipic, pimelic, suberic, azelaic and sebacic acids.

HERMAN ALEXANDER BRUSON.